US006966661B2

(12) United States Patent
Read

(10) Patent No.: US 6,966,661 B2
(45) Date of Patent: Nov. 22, 2005

(54) HALF-ROUND TOTAL INTERNAL REFLECTION MAGNIFYING PRISM

(75) Inventor: Robert Lee Read, Austin, TX (US)

(73) Assignee: Robert L. Read, Austin, TX (US)

( * ) Notice: Subject to any disclaimer, the term of this patent is extended or adjusted under 35 U.S.C. 154(b) by 70 days.

(21) Appl. No.: 10/665,058

(22) Filed: Sep. 16, 2003

(65) Prior Publication Data

US 2005/0057828 A1 Mar. 17, 2005

(51) Int. Cl.[7] .................................................. G02B 5/10
(52) U.S. Cl. ...................................... 359/868; 359/853
(58) Field of Search ................................ 359/364, 365, 359/727–731, 834, 853, 856, 857, 858, 868, 359/869

(56) References Cited

U.S. PATENT DOCUMENTS 2,759,106 A * 8/1956 Wolter ......................... 378/43
4,357,075 A * 11/1982 Hunter ....................... 359/858
4,483,311 A 11/1984 Whitaker
4,828,348 A 5/1989 Pafford
4,955,687 A 9/1990 Pafford
5,056,892 A 10/1991 Cobb, Jr.
5,241,426 A 8/1993 Mochimaru et al.
5,644,431 A 7/1997 Magee
5,699,186 A 12/1997 Richard
6,049,429 A 4/2000 Iizuka et al.
6,123,436 A * 9/2000 Hough et al. ............... 362/296
6,163,400 A 12/2000 Nanba
6,252,155 B1 * 6/2001 Ortabasi ..................... 136/246
6,366,411 B1 4/2002 Kimura et al.
6,634,759 B1 * 10/2003 Li ............................. 359/853

OTHER PUBLICATIONS

"X-ray Imaging Systems" http://imagine.gsfc.nasa.gov/docs/science/how__12/xtelescopes__systems.html.
Andreas Timinger, Abraham Kribus, Pinchas Doron, Harold Ries, "Faceted Concentrators Optimized for Homogeneous Radiation", Applied Optics, vol. 39, No 7, Mar. 1, 2000, p 1192.

* cited by examiner

*Primary Examiner*—Mark A. Robinson
*Assistant Examiner*—Alessandro Amari

(57) ABSTRACT

It is taught that two reflective parabolic or paraboloidal surfaces of different scales whose axes point in opposite directions but which share a common focal point can be used as an image forming telescope. If only a portion of a parabolic or paraboloidal sliced along the optical axis is used as the surfaces, then they can be configured so that light rays strike the surfaces at such angles as to be totally internally reflected. Thus a solid prism can be constructed that serves as telescopic or non-imaging collector of light with no loss of energy due to internal reflection or refraction. Since this system does not depend on an optically precise entry surface, it may be useful in fiber optic and solar power applications.

16 Claims, 7 Drawing Sheets

HALF-ROUND TOTAL INTERNAL REFLECTION MAGNIFYING PRISM

BACKGROUND OF THE INVENTION

This invention relates to basic geometric optics. It teaches that two optically reflecting parabaloidal surfaces that share a focus with optical axes in opposite directions form a magnifying system.

DESCRIPTION OF PRIOR ART

Optical systems can be constructed using the science of geometric optics from lens, mirrors, and prisms. Lens are generally curved and modify the path of light by refraction. Mirrors may be curved or flat and modify the path of light by reflection. Mirrors are generally made of glass coated with a thin layer of a shiny metal. Some energy is always lost when light reflects off this metal surface. Prisms such as a corner cube modify light by reflecting it off air-glass surfaces, sometimes multiple times. A corner cube uses total internal reflection off two "back" surfaces to act as a mirror. No energy whatsoever is loss due to the phenomenon total internal reflection under normal circumstances.

There are a huge number of optical systems that employ combinations of mirrors, lenses, and prisms to act as a telescope. A telescope constructs a generally magnified image of a distant object. A microscope is a closely related optical system that constructs magnified images of near objects.

Any optical system that does not employ gradual changes in the index of refaction of materials can be analyzed in terms of its surfaces. These surfaces can be refractive, in the case of a lens, or reflective, in the case of a mirror. A typical surface, such as the interface between a piece of glass and air, is generally both reflective and refractive depending on the angle and nature of light based on Fresnel's equations. See for example Hecht and Zajac "Optics" 1974, Addison-Wesley Publishing Company, as a basic optics reference.

U.S. Pat. No. 5,699,186, Richard, Fred V. demonstrates multiple reflections inside a prism due to internal reflection, at least some of which are by curve surfaces, as in the TIR mag prism. U.S. Pat. No. 6,049,429, Iizuka, Toshimi, and Ishino, Toshiki also teaches the use of curvature on the back side of a prism to produce focusing power. U.S. Pat. No. 6,366,411, Kimura et al. teaches the use of three curved surfaces providing total internal reflection to shape a wavefront with focusing power with great compactness. U.S. Pat. No. 6,163,400 clearly teaches the use of several internally reflecting surfaces to shape a wavefront, though it appears to also use precisely curved surfaces at the entrance and exit pupils, a feature not required by the TIR mag prism.

In the field of non-imaging optics, the goal is generally to collect energy into a small place without necessarily maintaining an image. There have been many inventions that involve multiple optical systems of the same kind, often reproduced in miniature in large number, for example U.S. Pat. No. 5,644,431 by Magee, John Allen. An attempt to do this is taught by U.S. Pat. No. 5,056,892, by Cobb, Jr.; Sanford. A system of telescopes (U.S. Pat. No. 4,483,311 Whitaker) have been arrayed together in sheets to collect solar energy. This sun-facing surface of this system consists of convex lenses that may be expected to be harder to maintain and clean than a flat plane.

The value of feeding solar energy directly into a light pipe, such as optical fiber, has been recognized and taught by the aforementioned patents by Cobb and Whitaker, and also by U.S. Pat. No. 4,828,348, by Pafford. U.S. Pat. No. 4,955,687, by Pafford, teaches a Cassegrain telescope feeding into a light pipe, and a means of feeding several light guide sources into one pipe, but does not appear to consider the fundamental physical limitation that the acceptance angle of a light pipe imposes. Further, the many popularly known attempts to concentrate solar power with a dish-shape mirror into a central mirror or receiver of some kind all suffer from the disadvantage of blocking at least a small fraction of the sun's energy with the central, front-of-the-mirror receiver and the necessary structure to support it. Vignetting by a central obstruction is a disadvantage of many traditional reflective optical systems.

Electromagnetic radiation at very high frequencies, such as X-rays, cannot be manipulated with typical optical systems but can be reflected off special mirrors if the angle of glancing is low (for example, 1 degree.) To image X-rays, telescopes quite different than optical frequency telescopes had to be developed. Glancing Incidence telescopes are a class of telescopes that apply low glancing angles to produce a real image of radiation. Examples include a design by Kirkpatrick-Baez, 1948, and an improvement by Wolter, 1951. The Kirkpatric-Baez design is similar to the TIR mag prism in using two parabolic (not paraboloidal) surfaces. These two are used to provide focusing power in orthogonal directions. The Wolter design is similar to the TIR mag prism in that the radiation direction is never reversed or refracted, although the geometric configuration is entirely different. U.S. Pat. No. 5,241,426 by Mochimaru, et. al., teaches the use of a paraboloid of revolution to form a focused image of X-rays at very low glancing angles. This could be considered the extention of normal parabolic telescope objective mirrors to very high f-numbers and then limiting the used area to that which will glance the incoming rays at low enough angle to support reflection. All of these systems consist of an objective mirror system only; that is, the take a virtual image into a real image that can affect a photographic emulsion. The TIR mag prism differs in many ways but in particular by being an objective and an ocular, that takes a virtual image to a virtual image, as a conventional telescope does when an eyepiece is installed.

The value of a having a polygonal aperture capable of tiling the plane so that a all of the available collector surface can be used has been recognized by for example "Faceted Concentrater Optimized for Homogenous Radiation" by Andreas Timinger, Abraham Kribus, Pinchas Doron, Harald Ries, Applied Optics Vol. 39, No 7, 1 Mar. 2000, p. 1152, which works with the now-classic compound parabolic collector.

BRIEF SUMMARY OF THE INVENTION

My invention, the half-round total internal reflection magnifying prism, called TIR mag prism in short form, has the objective of modifying the path of light without loss of energy or brightness due to reflection from a mirrored surface nor from the partial reflection that occurs at every refractive interface. In particular, it transforms a virtual image at one end of the prism into a virtual image of a different size at the other end of the prism. Being potentially made of a single unbroken piece of transparent material, such as glass or plastic, it may be more practically manufactured and employed for this purpose then magnifying optical systems made of several lenses or mirrors, in addition to being more efficient due to having only total internal reflection faces.

The basic operation on the light the TIR mag prism performs is the same as that performed by a telescope. Thus the TIR mag prism can potentially be used as a telescope, to form a magnified image of a distant object. More generally it could potentially be used in opto-electronic devices as a miniature one-piece optical pickup. Moreover, the basic function can also be used to collect a signal or power into a a smaller channel. Since the TIR mag prism has no lossy medium-to-air interfaces, it may be very usefully employed for coupling optical fibres carrying signals or power. Additionally, since the TIR mag prism has no entry face and no exit face, it may be ideal for manufacture in mosaic form similar to lens arrays for the purpose of concentrating solar power. Since light can move through any lens or prism in both directions, the TIR mag prism can also be used to diffuse or demagnify light if light is fed into the smaller end.

A further advantage of the TIR mag prism is that it has a light path free of central obstructions. All economically feasible reflecting telescopes have a so-called central obstruction which holds the secondary mirror. This obstruction slightly decreases the light-gathering power of the telescope and decreases its resolution due to the diffraction of light around this central obstruction. It is an interesting feature of the TIR mag prism that it has no such central obstruction. Since in some emodiments it has no metallic surfaces, it imparts no frequency specific transmission bias due to the properties of the metal. This may make it an optically useful astronomical telescope; it may also allow it to be used for microscopic applications such as light-sensing in consumer electronics or other sensometric applications.

An additional advantage is that it is an optical system designed to rely on low angles of incidence, or glancing angles. It thus may function with very high-frequency electromagnetic radiation, such as X-ray radiation, which is technically above the frequency of human vision but still a province of geometric optics in general. For example, the Chandra X-ray Observatory uses a glancing metal mirror to focus X-rays (since X-rays only reflect off metal at very low angles). Further objects and advantages will become apparent from a a consideration of the drawings and ensuing description.

DRAWING FIGURES

FIG. 1 demonstrates the arrangement of two two-dimensional reflecting surfaces.

FIG. 2 demonstrates the basic arrangement of two three-dimensional reflecting surfaces.

SUMMARY

In accordance with the present invention, two optical reflecting parabaloidal surfaces that share a focus with optical axes in opposite directions form a magnifying system.

DESCRIPTION—FIGS. 1 to 7

Figure 1:
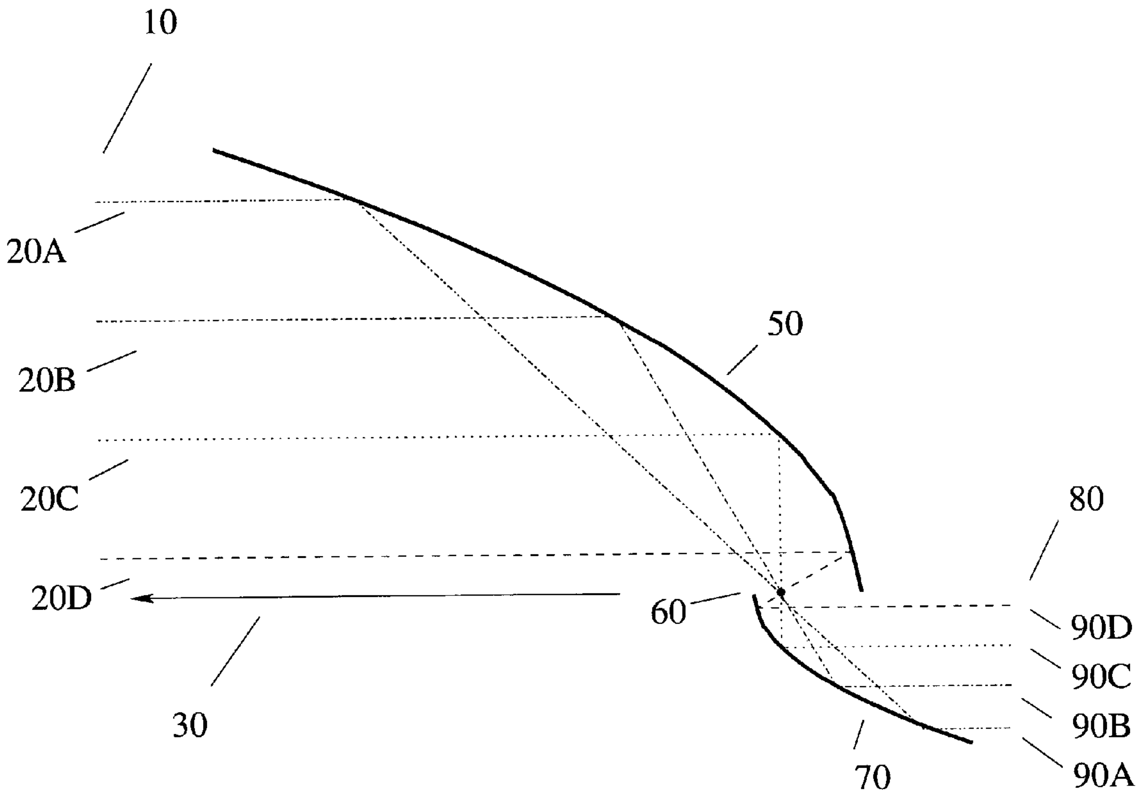

A typical embodiment of the magnifying system of this invention is illustrated in FIG. 1. An image 10 consisting of substantially parallel rays 20A,20B,20C,20D are intercepted by a large parabolic surface 50. This surface corresponds to the objective in a typical optical system. The rays 20A,20B, 20C,20D are reflected to near the focal point 60. The focal point 60 is the focal point of the large, objective parabolic surface 50, but is also the focal point of a smaller parabolic surface 70. The smaller parabolic surface has an axis parallel to but opposite that of the larger parabolic surface. The smaller parabolic surface may be referred to as the ocular surface traditionally. It is a static property of surfaces arranged in this way that the reflections of the rays 20A, 20B,20C,20D will exit the system as a smaller, brighter image 80 of the entry image 10 composed of rays 90A,90B, 90C,90D.

Figure 2:
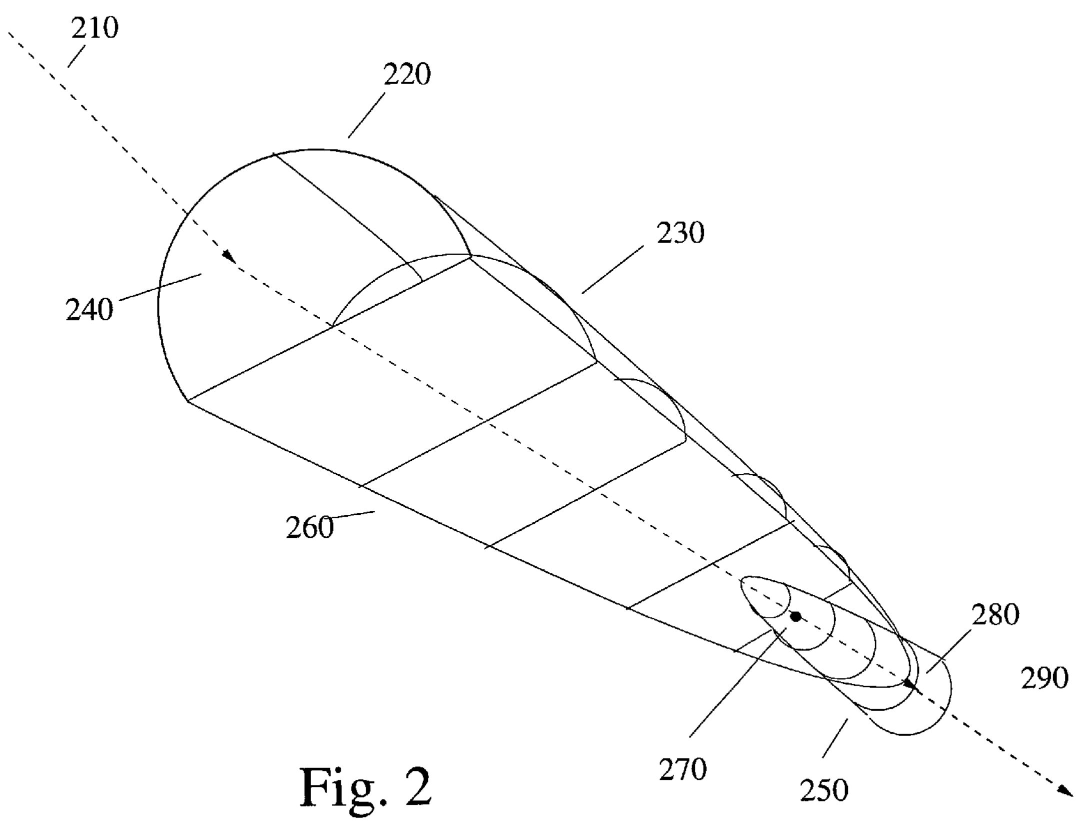

FIG. 2 shows an additional embodiment, in three dimensions by contrast. In this embodiment, we use a solid transparent medium such as glass to form the objective reflecting surface 230 and the ocular reflecting surface 270. This embodiment consists of a single object made of glass, that I name a TIR mag prism. A ray of light or other electromagnetic radiation 210 that is substantially parallel to the optical axis of the TIR mag prism strikes an optical flat surface of the TIR mag prism 220 that is perpendicular to the optical axis of the prism. The ray enters the prism and strikes the objective surface 230 at a point 240. It travels to near the focal point of the objective 270. This point 270 is also the focal point of the ocular 250. The ray passes through plane between the objective and ocular 260, encased in glass at all times and encountering no interface until it reaches the ocular surface 250 at reflecting point 280. The reflection of this ray exits the optically flat exit surface (not visible in this perspective) as exit ray 290. In this drawing arrowheads have been added to the ray to show travel in direction from entry to objective to ocular to exit, but the choice of one direction or the other as entry or exit is arbitrary.

Figure 3:
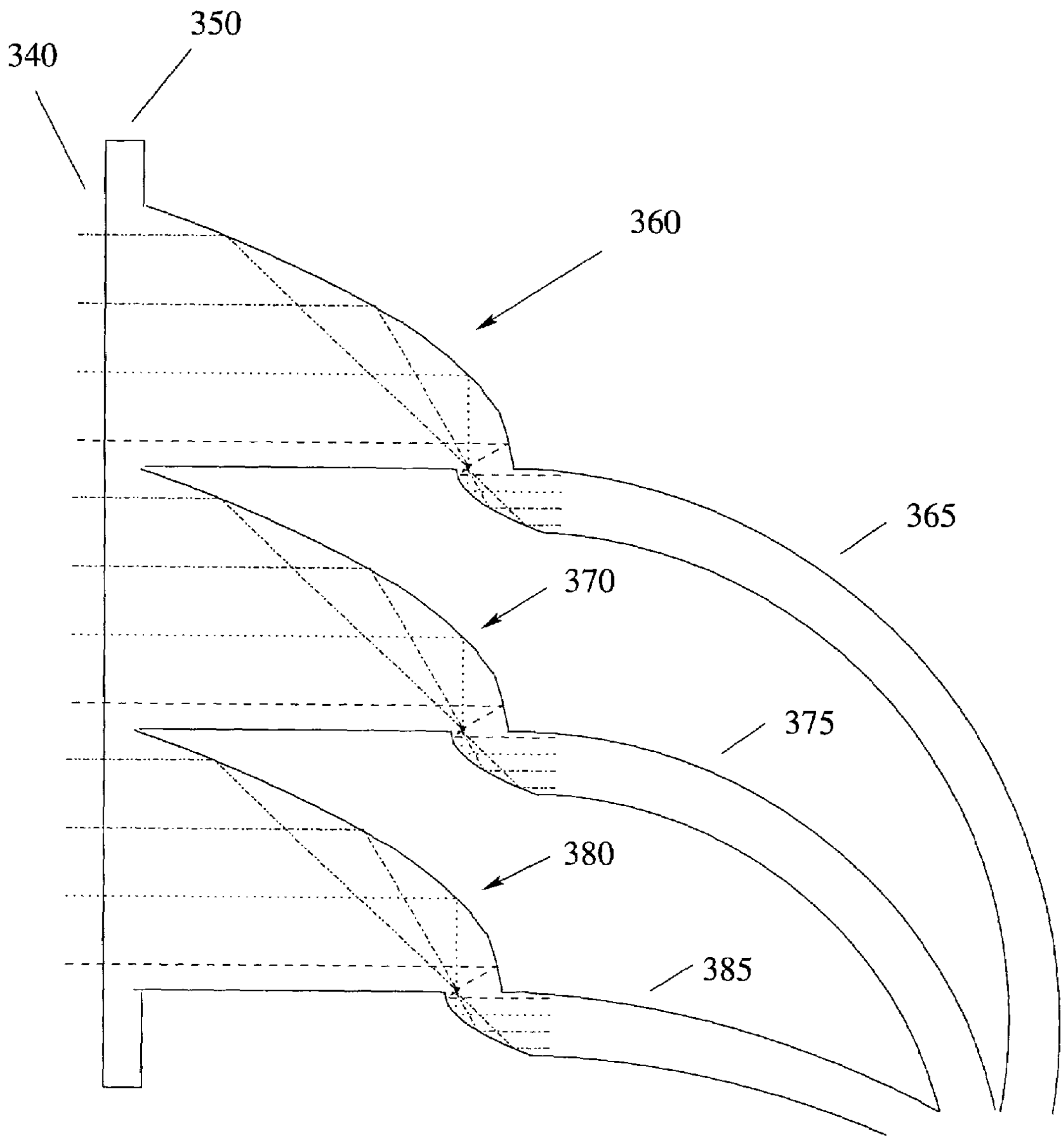
FIG. 3 shows a cellular, internally reflecting two-dimensional arrangement of reflecting surfaces and collecting light-guides.

FIG. 3 shows a preferred two dimensional embodiment for solar energy collection in which an array of many prisms laid adjacent to each other conducts light into as many small light guides. Solar radiation strikes an optically flat surface 340 formed by a single piece of transparent material that is structurally strong. This material holds together, without loss of generality, in this example, three two-dimensional TIR mag prisms similar to those shown in detail in FIG. 1, 360, 370 and 380. This single piece of solid or fused material connects light-guides 365, 375 and 385 of a transpartent material to the exit pupils of the three TIR mag prisms.

Figure 4:
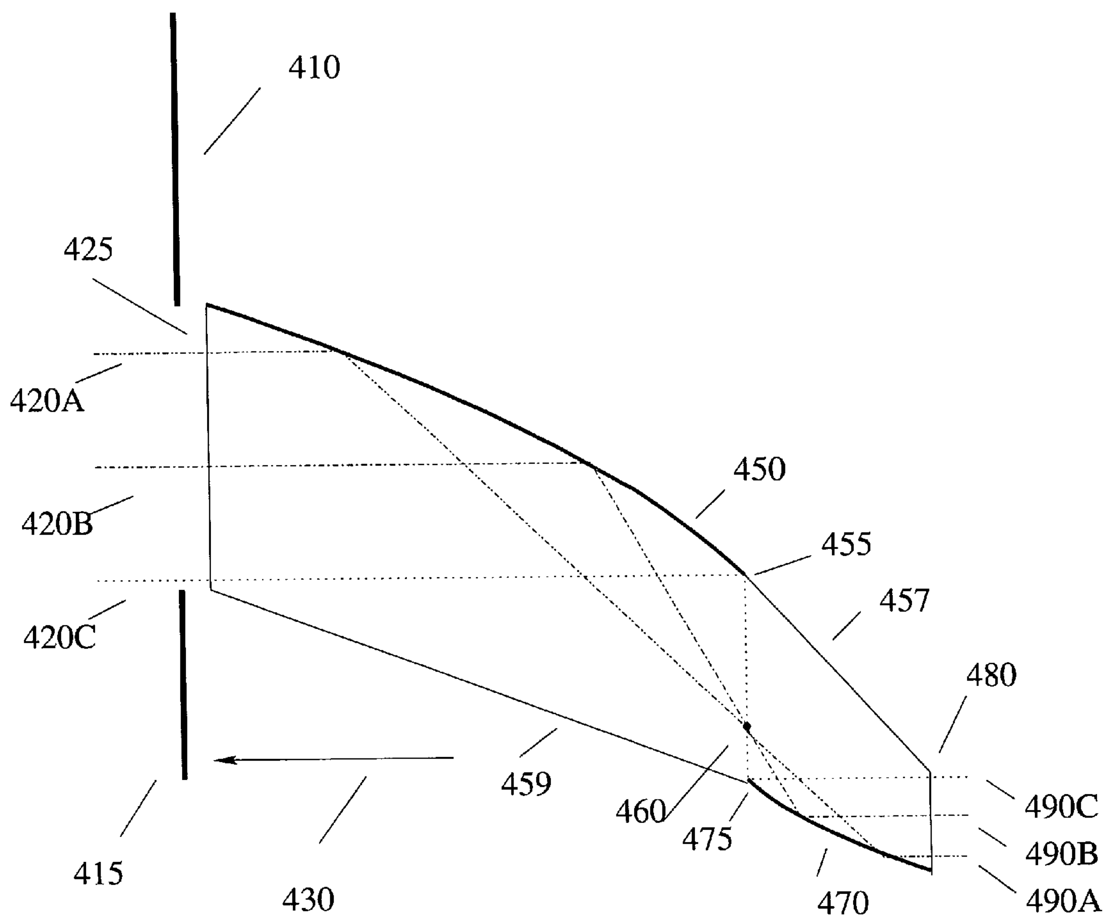
FIG. 4 shows regions that are completely totally internally reflective and means of masking to obtain an aperture and a prism of smaller aperture which magnifies and image with only total internal reflection.

FIG. 4 shows a two-dimensional embodiment of a TIR mag prism with the addition of an aperture baffle (light-stop) that limits the passed rays to only those that are totally internally reflected. The upper baffle is 410 and the lower baffle is 415. Incident rays 420A,420B, and 420C substantially parallel to the optical axis 430 enter the solid transparent material through an optically flat surface 425. These strike the objective 450 interface and are totally internally reflected since they strike at an incidence angle greater than the critical angle. The objective surface extends to the point 455, the point where a ray strikes at the critical angle. The critical angle is a function of the index of refraction of the solid material comprising the TIR mag prism (probably glass) and the outer material (probably air.) For realistic materials the critical angle can be about 45 degrees. Since the baffles 410 and 415 prevent rays from striking the surface 457, that connects the objective surface 450 to the exit surface 480, the surface 457 is not optically significant. Similarly, no rays strike surface 459 that joins the entrance pupil 25 to the ocular surface 470. The entry rays 420A, 420B and 420 reflect close to the shared focal point 460 and reflect off the ocular surface 470 and out the exit pupil surface 480, forming a smaller brighter virtual image than the entry virtual image.

Figure 5:
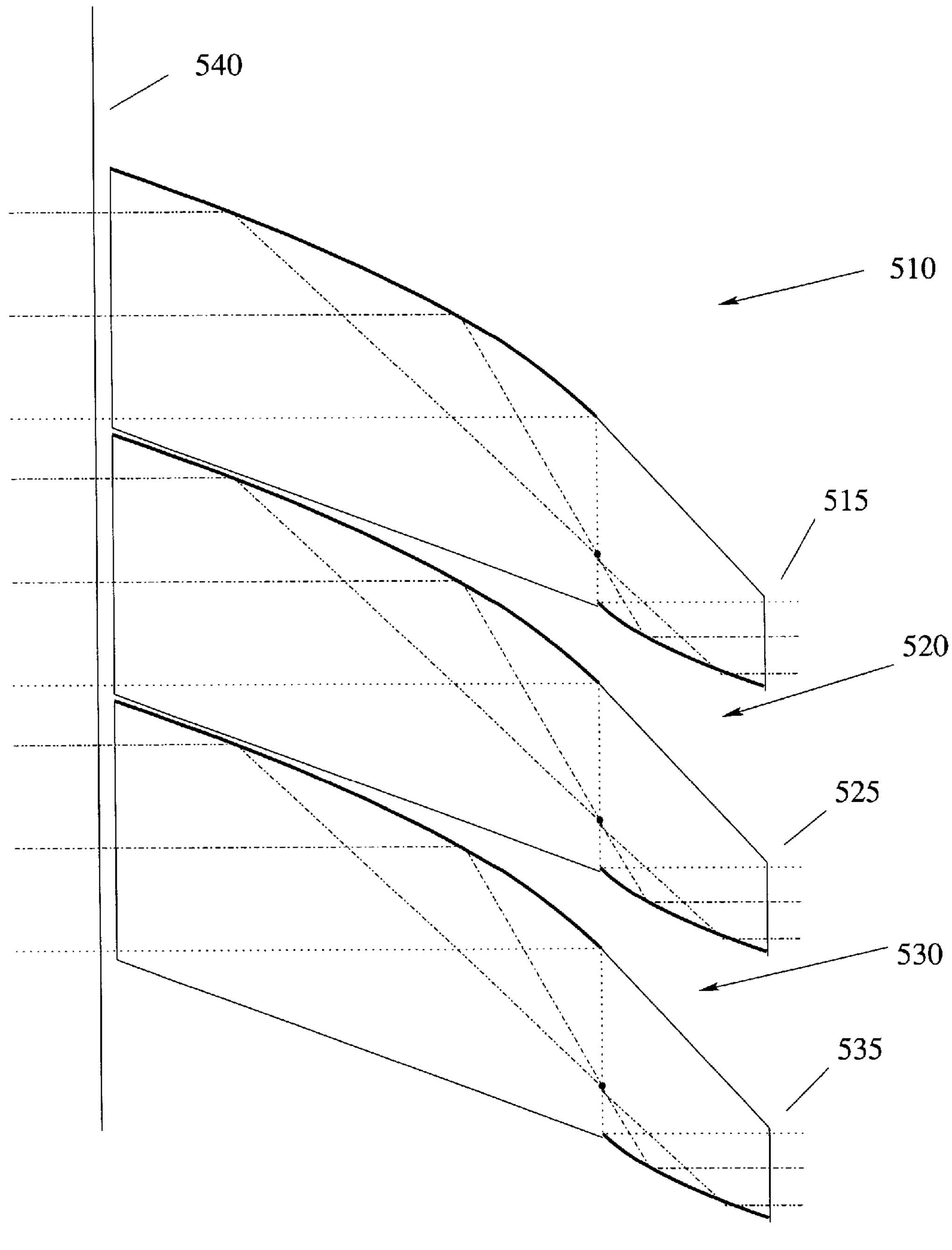
FIG. 5 shows a set of two-dimensional TIR mag prisms with smaller apertured stacked in such a way that 100% of the light incident on a plane can be transmitted without internal loss to exit pupils.

FIG. 5 shows a stacking of the two-dimensional TIR mag prism limited to total internal reflection such that all light incident on the entry surface is conveyed to the many exit pupils without internal loss of energy. TIR mag prisms 510, 520 and 530 are shown stacked together so that substantially 100% of the light incident on the plane 540 that is substantically perpendicular to the entry plane 540 is magnified and transmitted without internal loss due to refraction or reflection to the multiple exit pupils, 515, 525, and 535 respectively.

Figure 6:
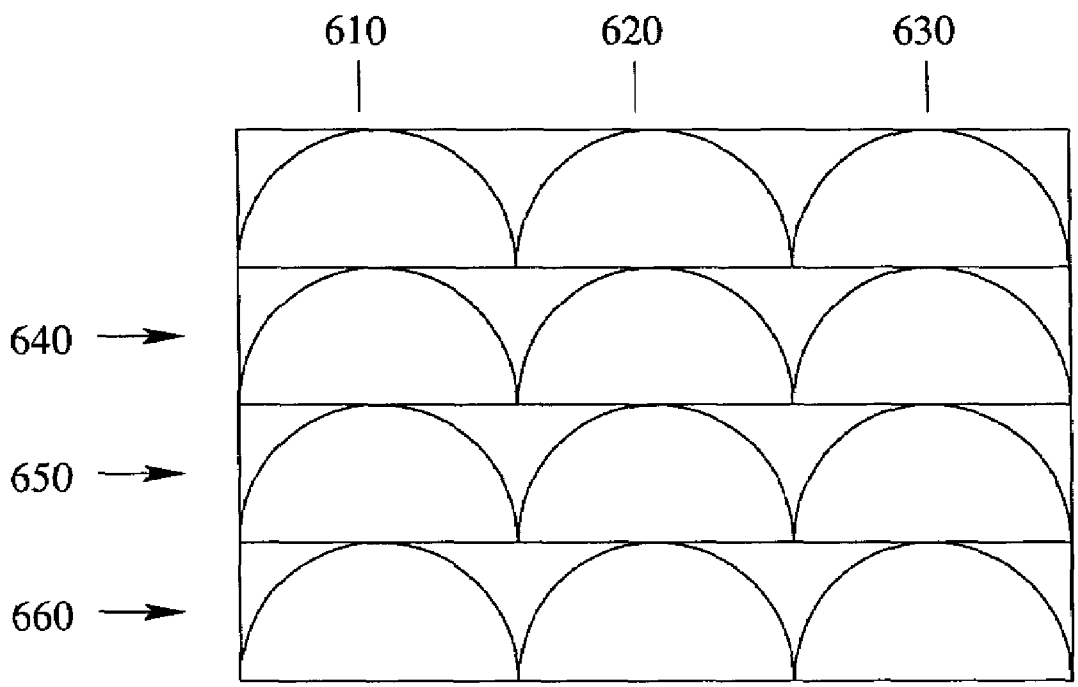
FIG. 6 shows a face-on view of 12 three-dimensional TIR mag prisms arranged in a 3×4 array, demonstrating an approach to capturing energy from a large planar area with an array of many cells.

FIG. 6 shows a face-on view of a 3×4 array of 12 three-dimensional TIR mag prisms stacked together so as the cover a plane that could be aimed at the sun or other source of radiation. Each semi-circle (such as 610, 620 and 630 represents an aperture of a three-dimensional prism as shown in FIG. 2. The rows 630, 640 and 650 represent a similar set of apertures repeated in the vertical direction. All of these apertures could be joined to a single, solid piece of glass as those in FIG. 3.

Figure 7:
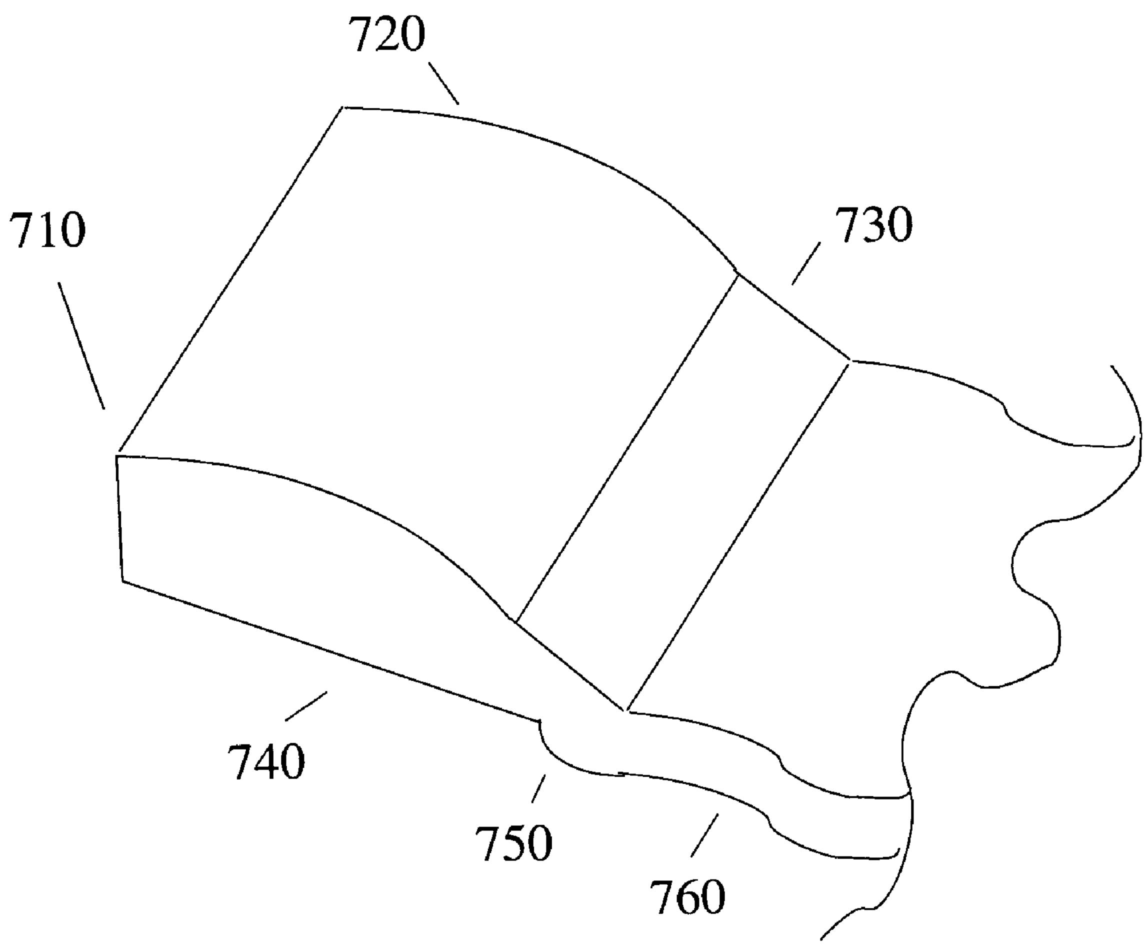
FIG. 7 is a perspective view a two-dimensional image collector capable of being stacked to tile a plane.

FIG. 7 shows a single perspective drawing of a single cell from FIG. 3, being two-dimensional and therefore of indefinite length. However, it also shows the restriction to the total internally reflecting part of the TIR mag prism demonstrated in FIG. 4. The face 710 receives rays of light that bounce from the parabolic surface 720 to a parbolic surface 750. The rays then enter a light guide 760, to be conducted away to a useful point. This light guide is draw in a wavy manner to emphasize that it may be flexible and can have bends that are not too sharp in it without loosing light. The surface 730 is shown as being different from 750 in that no light strikes it due to baffling, as explained by FIG. 4. Surface 740 similarly does not participate in any reflections.

OPERATION

FIG. 1 demonstrates the basic optical configuration of two reflecting surfaces which is the basis of this invention. FIG. 1 thus represents a two-dimensional embodiment, but it could also be considered a cross-section of a three-dimensional embodiment. The basic operation is to utilize the fact that a parabolic reflecting objective Surface 50 brings all rays that are close to parallel to the axis of the parabola 30 to a single focal point 60. This is precisely the way a conventional Newtonian telescope works, except that traditionally such telescopes use a symmetric parabolic surface, and use only the portion at the bullet-shaped tip of the parabola, so that in a traditional telescope the mirror is not so sharply curved as in FIG. 1. However, the TIR mag prism places the ocular reflecting surface 70 across the optical axis from the objective. This allows the entire aperture of the objective to usefully collect light, as there is no central obstruction as there is in a typical Newtonian telescope. Of course, in this arrangement, the objective could be considered to be only half that of a traditional telescope, whose objective would collect light from both above and below the optical axis. This allows us to stack the TIR mag prisms efficiently as described later and shown in FIG. 5.

The ocular is the same parabolic shape as the objective, but on a smaller scale, and with its optical axis pointing in the opposite direction. The focal point of the ocular 70 is the same point as the focal point of the objective 60. Thus an incoming ray that is perfectly parallel to the optical axis 30 that strikes the objective 50, such as for example rays 20A, 20B, 20C and 20D will be reflected to precisely the shared focal point 60. They will travel unimpeded on to the ocular reflecting surface 70. The parabolic shape of the ocular reflects each ray precisely parallel to the optical axis. Since the ocular is intentionally smaller than the objective in this embodiment, the resulting rays form a brighter, smaller virtual image 80 on their exit as rays 90A, 90B, 90C and 90D of the original image 10 formed by rays 20A, 20B, 20C and 20D respectively. Thus the operation on perfectly parallel rays is easy to understand.

However, in optics we must be concerned not just with those perfectly parallel rays, but with rays which are at a slight angle from the optical axis. For example, the sun in the sky as seen from earth subtends an arc of about one-half of one degree. Thus, if we seek to image the sun for the purpose of collecting solar energy (which is one object and advantage of this invention, though the invention is quite general) we must understand what happens to rays one-fourth of one degree above or below the optical axis. This is entirely analogous to geometrical optical analysis of traditional thin and thick lens and mirror systems, except for the unique arrangement of reflecting surfaces under consideration in this invention.

Incoming rays of light that are a small angle from the optical axis will be reflected through a point close to but not precisely the same as the focal point 60. These reflected rays continue unimpeded until they strike the ocular reflecting surface 70. Two rays that strike the objective at a given point but at slightly different angles will thus strike the ocular at two different points. The distance between these points will depend on the angle with which the incoming rays differ and also where on the objective they strike. Optical system suffer from coma, an optical aberration created by the slightly different lengths of the paths that rays take through the system. In traditional optical systems, designers seek to minimize coma. The optics of this invention have very high comatic aberration, much more than a similar traditional reflecting or refracting telescope would have. This aberration distorts the output image, but nonetheless the output does form a virtual image that would be recognizable so long as the incoming rays are relatively close to parallel with the optical axis.

It is important to note that reflecting surfaces in FIG. 1 can be formed in a variety of ways. For example, they could be metalic mirrors formed from a shiny coating of aluminum. Or, as will be seen later, these reflecting surfaces could merely be the back surfaces of a glass-air interface, as in a reflecting prism, and the the reflection could be from total or partial internal reflection.

FIG. 2 shows the same invention in a three-dimensional embodiment that demonstrates the use of a solid transparent objects for forming the reflective surfaces. This whole object could be considered a new kind of prism, in that it might be made of a single solid chunk of transparent glass or plastic, the whole of which could be utilized as a single, one-piece telescope, albeit it with a semicircular field of view and an unfortunate amount of comatic abberation. In this three-dimensional embodiment, the reflectiong surfaces of the solids formed by revolving a parabola about its axis through 180 degrees. As in the two dimensional case, the ocular is the same shape as the objective but smaller, points in the opposite direction, and shares the focal point with the objective. Such a physical object could be formed as a single object, or by fusing together two paraboloidal shapes.

FIG. 3 demonstrates one of the embodiments of the invention. Multiple instances of the TIR Mag Prism are arrayed together in a celluar fashion so that all point in the same direction. Understanding FIG. 2, we see that this could theoretically be a single object of transparent material that holds many TIR Mag Prisms together structurally. If this array were pointed at the sun, light would enter each cell. In the two dimensional case depicted here in FIG. 3, all of the light that falls on the flat energy collecting surface will enter some TIR Mag Prism cell. In some embodiments of those cells, a high proportion of the light will in fact be directed to the light guides attached without an optical interface at the exit pupils. To make these light guides as small as possible, we want the maximum magnification that results in an angle of dispersion of the virtual image of the sun formed at the exit pupil such that this angle is entirely accepted by the light guide. The practical design of such a solar energy collector is thus a tradeoff between the intensity of the light that can be piped away and the efficiency of the TIR Mag Prism at getting light into the guide. Of course, other economic considerations also apply, such as ease of cleaning and the ability to resist wind damage, but I think that in principle the cellular TIR Mag Prism piping light into flexible guides offers the advantages of:

very low loss of light due to internal interfaces or reflections, the ability to acheive high magnification and thus small light-guide mass, simplicity of one-piece construction.

FIG. 4 demonstrates a mechanism for improving the reflective efficiency of the TIR Mag Prism by limiting its aperture to the region of 100% reflective efficiency if the Prism is formed from a solid transparent material, such as glass. It is a property of light traveling in glass or any optically dense material that when it encounters an interface to a less dense material, such as air, that, by Snell's law, there is an angle at which no energy will be refracted through the interface but all energy will be reflected. (More energy is reflected when the ray glances the interface, rather than striking it perpendicularly.) For typical indexes of refraction for glass (e.g. approximately 1.4) and air (e.g. 1.0), this angle is close to 45 degrees, give or take 5 or 10 degrees depending on the index of refraction of the glass. If we examine FIG. 1 carefully, we see that rays 20A, 20B, and 20C strike the objective reflecting surface at an angle less than 45 degrees, but that the ray 20D clear strikes at greater than 45 degrees, and although there would be a reflection there would also be a refracted ray, and thus considerable energy would be lost through the objective itself. This could be stopped by metalizing that portion of the objective, but a metal reflector is not 100% reflective as is total internal reflection. This solution to this problem as shown in FIG. 4 is to only use that portion of the objective that is completely internally reflective. This allows for a similar change in the ocular, and for changing the shape of the solid prism as shown with surfaces that do not interact with the incoming light or its reflections. The resulting aperture-limited and baffled prism would be 100% reflective, and would lose no light internally. (Of course, the entry into the glass and the exit out of the glass would entail the loss typical of air-glass interfaces, which is about 4% when the light is perpendicularly enterring and exiting. Thus if the prism where actually used as a telescope, which is not its main purpose due to its excessive comatic aberration, it would have losses at the entry and exit pupils. However, this would still be brighter than any existing telescope design. The loss at a plain glass/air interface can be reduced by special coatings, and this is typically done on refracting telescopes, and of course the same could be applied to a solid glass magnifying TIR prism telescope if so desired.)

FIG. 5 demonstrates one of the practical affects of the aperture-limiting shown in FIG. 4. Note that the limiting of aperture alllows the individual TIR mag prisms to be stacked closely together. This is similar to FIG. 3, but with the aperture-limited shape. The resulting composite system is an improvement on FIG. 3 in that there are no internal losses, but still 100% of the light enterring the flat, sun-facing surfaces will enter some TIR mag prism. FIG. 5 shows three modular TIR mag prism cells but obviously any number could be used in an actual manufacture. It is important to note that FIG. 5 demonstrated a mechansim for collecting all the energy via a two-dimentional collector only. If we stack a large number of three-dimenstional TIR mag prisms together (such as those shown in FIG. 2) we can construct a planar solar energy collector, but it will consists of a plane tiled with many semi-circular apertures, and thuse will have a significant surface area that does not collect light (in particular ((4−PI)/4)=21.4%). If we limit the aperture as described in FIG. 4 to the three dimensional case, the resulting aperture will be but a fraction of a circle (about one-fourth of a circle, for example), and thus will cover the plane even less efficienctly. However, such a system would provide total internal reflection at 100% efficiency.

FIG. 6 shows a face-on view of a stacking of the three-dimensional TIR mag prisms. The aperture of each such prism is a semicircle 610, 620 and 630, showing that not all of the radiation-receiving plain can effectively absorb energy if three-dimensional TIR mag prisms are usesd. However, these prisms will have higher concentrating/magnifying power than the two-dimensional versions. Repeatable rows of many apertures such as 640, 650 and 660 can be used to tile a plane of any size in this way. The resulting machine, if constructed with a solid front as demonstrated in FIG. 3, would be a plane that if pointed at the sun or some other distant source of radiation would conduct light into a large number of relatively small light guides, that could convey the light to a convenient place.

FIG. 7 a perspective view of a cell of indefinite length that uses the aperture limiting feature demonstrated in FIG. 4. The face 710 receives rays of light that bounce from the parabolic surface 720 to parbolic surface 750. The rays then enter a light guide 760, to be conducted away to a useful point. This light guide is drawn in a wavy manner to emphasize that it may be flexible and can have bends that are not too sharp in it without losing light. The surface 730 is show as being different from 750 in that no light strikes it due to baffling, as explained by FIG. 4. Thus, FIG. 7 demonstrates a system that could be stacked as in FIG. 3 to cover an entire plane such that 100% of the perpendicularly incident energy will be directed into the light guides such as 760.

SUMMARY, RAMIFICATIONS, AND SCOPE

This invention makes possible the forming of a magnified virtual image without any loss due to internal reflection or refraction within limited apertures. This may have useful application for normal optics; that is, it may allow a telescope, eyepiece, magnifier, microscope, etc. to be constructed that is simpler and produces a brighter image than normal lens-based systems. However, the TIR mag prism may have more comatic aberration than thin lens systems.

More importantly, there are many applications where the goal is to collect all of the incoming electromagnetic energy. The fact that this invention does form a virtual image, which is generally not required in energy-collecting applications, should not mislead one into assuming this is not applicable as an energy collector. As an energy collector, the fact that within some regions the TIR mag prism has no loss whatsoever is an outstanding feature.

Solar energy collection is a vivid example of an application whose cost-effectiveness is highly tied to the efficiency of collection. As shown in examples, the ability to construct arrays of TIR mag prisms may provide exceptional efficiency compared to size and weight, and therefore indirectly cost. However, there may be other applications, such as those circumstances sometimes referred to as "optical pickups", when a small amount of energy is collected from a very small spot. In such applications, efficiency may still be very important.

The elegance of the embodiment as a single, one-piece object made of transparent material like glass or plastic that magnifies in this way is of note. Traditional lens and prism systems have used spherical surfaces due to their ease of manufacture. The surfaces of the TIR mag prism are extremely non-spherical; however, if modern manufacturing techniques can manufacture these surfaces efficiently, the one-piece nature of this invention may be very valuable. This value applies either to construction of individual prisms or to arrays of prisms as demonstrated.

It should be noted that the basic principle of the TIR mag prism is to use glancing rays that are reflected at very shallow angles, compared to typical systems. This may allow the TIR mag prism to usefully collect and image electromagnetic radiation higher than the optical spectrum, such as X-rays. Normally such collection need not form a virtual image, since X-rays are normally directed onto film as a real image. However, they may still be great advantage in a virtual-image-forming system such as the TIR mag prism.

Finally, it should be noted that although we speak of "magnification" which generally means forming an image that is easier to see (closer to the eye), the systems embodied here are completely symmetric in terms of which face light enters. Thus they can be used for "demagnification" and energy dispersion just as easily as "magnifciation" and energy collection.

The scope of the invention should be determined by the appended claims and their legal equivalents, rather than by the examples given.

What is claimed is:

1. An apparatus for magnification, comprising:

an objective reflecting surface in the shape a truncated half-paraboloid formed by revolving a parabola about its axis for only 180 degrees of a full a revolution such that there is a plane defined by the optical axis and the parabolic edge of the surfaces, ocular reflecting surface of same shape but of different size, a means of positioning said objective reflecting surface and said ocular reflecting surface consisting of a solid material that is substantially transparent to some electromagnetic radiation and fills the inner space between the objective reflecting surface and the ocular reflecting surface such that their axes are substantially colinear but point in opposite directions, their focal points are at substantially the same shared point, they are on opposite sides of the shared focal point, and the planes formed between the optical axis and the parabolic edge of each surface are in the same plane in space, whereby a virtual image may be magnified or demagnified.

2. The apparatus of claim 1 wherein the surfaces are reflecting because the inner transparent solid material that is proximal to the optical axes has a higher index of refraction than the surrounding material that is distal from the optical axes, wherein a single solid object magnifies with substantially no losses due to reflection from metal or losses from internal air-material interfaces.

3. The apparatus of claim 2 repeated many times in a planar array such that the optical axis of each apparatus is parallel whereby solar energy can be collected from a single solid object made out of a structural transparent material with no internal air-material interface that is thin and light relative to its collecting area.

4. The array of claim 3 wherein each cell feeds solar energy into a flexible light guide, whereby solar can energy be collected from a single solid object made out of a structural transparent material with no internal air-material interface that is thin and light relative to its collecting area and transported to a convenient distant place.

5. The apparatus of claim 2 with light baffles so that a reflecting telescope with an unobstructed aperture having no internal refraction or reflection losses is created.

6. The apparatus of claim 1 wherein the surfaces are reflecting because of the application of a specular material to the transparent solid material where the reflecting surfaces are formed, enabling magnification by a single solid object.

7. The apparatus of claim 1 repeated many times in a planar array such that the optical axis of each apparatus is parallel, whereby optical energy can be captured by a device which is thin and light relative to its collecting area.

8. The apparatus of claim 1 repeated many times in a planar array such that the optical axis of each apparatus is parallel and the cells are held in place substantially through the structural solidity of the transparent material that is the optical medium, whereby optical energy can be captured by a single shaped object that is thin and light relative to its collecting area.

9. The apparatus of claim 1 with light baffles so that a reflecting telescope with an unobstructed aperture of semi-circular shape is created.

10. The apparatus of claim 1 wherein the reflecting surfaces are capable of reflecting higher-than optical frequency radiation and baffles limiting radiation to those surfaces that can serve to magnify or demagnify very high frequency radiation.

11. The apparatus of claim 1 repeated many times in a planar array such that the optical axis of each apparatus is parallel and the cells are held in place substantially through the structural solidity of the transparent material that is the optical medium, whereby optical energy can be captured by a single shaped object that is thin and light relative to its collecting area.

12. The array of claim 11 wherein each cell is reflecting because the inner transparent solid material that is proximal to the optical axes has a higher index of refraction than the surrounding material that is distal from the optical axes, whereby solar energy can be collected from a single solid object made out of a structural transparent material with no internal air-material interface that is thin and light relative to its collecting area.

13. The array of claim 12 wherein each cell feeds solar energy into a flexible light guide, enabling solar energy to be collected from a single solid object made out of a structural transparent material with no internal air-material interface that is thin and light relative to its collecting area and transported to a convenient distant place.

14. An apparatus for radiation concentration or diffusion, comprising:

an objective reflecting surface in the shape a truncated half-parabola formed by taking a truncated portion of one-half of a parabola from the vertex of the parabola to some other arbitrary point of truncation following a path from the vertex in one direction, an ocular reflecting surface of same shape but of different size, a means of positioning said objective reflecting surface and said ocular reflecting surface that is a solid material that is transparent to some electromagnetic radiation and fills the inner space between the two surfaces such that their axes are substantially colinear but point in opposite directions, their focal points are at substantially the same shared point, and they are on opposite sides of the shared focal point, whereby a two-dimensional virtual image may be magnified or demagnified or three-dimensional radiation diffused or collected.

15. The apparatus of claim 14 wherein the surfaces are reflecting because the inner transparent solid material that is proximal to the optical axes has a higher index of refraction than the surrounding material that is distal from the optical axes, enabling magnification with a single solid object with no losses due to reflection from metal or losses from internal air-material interfaces.

16. The apparatus of claim 14 repeated many times in a planar array such that the optical axis of each apparatus is parallel, whereby electromagnetic energy can be captured by a device which is thin and light relative to its collecting area.

* * * * *